United States Patent
Yuan et al.

(10) Patent No.: US 12,557,053 B2
(45) Date of Patent: Feb. 17, 2026

(54) MECHANISM FOR AVAILABILITY OF SYSTEM BROADCASTED INFORMATION

(71) Applicant: Nokia Technologies Oy, Espoo (FI)

(72) Inventors: Ping Yuan, Beijing (CN); Mads Lauridsen, Aalborg (DK); Jingyuan Sun, Beijing (CN); Srinivasan Selvaganapathy, Bangalore (IN)

(73) Assignee: Nokia Technologies Oy, Espoo (FI)

(*) Notice: Subject to any disclaimer, the term of this patent is extended or adjusted under 35 U.S.C. 154(b) by 372 days.

(21) Appl. No.: 18/264,993

(22) PCT Filed: Mar. 5, 2021

(86) PCT No.: PCT/CN2021/079387
§ 371 (c)(1),
(2) Date: Aug. 10, 2023

(87) PCT Pub. No.: WO2022/183505
PCT Pub. Date: Sep. 9, 2022

(65) Prior Publication Data
US 2024/0137885 A1   Apr. 25, 2024
US 2024/0236895 A9   Jul. 11, 2024

(51) Int. Cl.
*H04W 56/00*   (2009.01)

(52) U.S. Cl.
CPC .............. *H04W 56/0045* (2013.01)

(58) Field of Classification Search
None
See application file for complete search history.

(56) References Cited

U.S. PATENT DOCUMENTS 9,354,323 B2 * 5/2016 Anderson ............... G01S 19/34
10,448,261 B2   10/2019 Sofuoglu
(Continued)

FOREIGN PATENT DOCUMENTS

CN   101444133 A   5/2009
CN   112398600 A   2/2021
(Continued)

OTHER PUBLICATIONS

Office action received for corresponding Indian Patent Application No. 202347064547, dated Nov. 28, 2024, 6 pages.
(Continued)

*Primary Examiner* — Wutchung Chu
*Assistant Examiner* — Berhanu D Belete
(74) *Attorney, Agent, or Firm* — Barta Jones, PLLC

(57) ABSTRACT

Embodiments of the present disclosure propose a solution for availability of system broadcasted information such as GNSS information which can be used for deriving time and/or frequency domain compensation. According to embodiments of this present disclosure, a validity timer for system broadcasted information is introduced in both UE and network to guarantee the system broadcasted information availability status is synchronized in two nodes, and the system broadcasted information is valid to pre-compensate in time and/or frequency domain when the timer is running. In this way, the UE can be scheduled with correct timing and frequency estimation in UL transmission.

20 Claims, 9 Drawing Sheets

(56) References Cited

U.S. PATENT DOCUMENTS

| | | | | |
|---|---|---|---|---|
| 2009/0318175 | A1* | 12/2009 | Sandberg | H04W 56/0045 455/502 |
| 2012/0194382 | A1* | 8/2012 | Anderson | G01S 19/34 342/357.29 |
| 2013/0121315 | A1* | 5/2013 | Langereis | H04W 56/0045 370/336 |
| 2015/0133151 | A1* | 5/2015 | Jung | H04W 24/02 455/456.1 |
| 2017/0215119 | A1 | 7/2017 | Hong et al. | |
| 2017/0289870 | A1 | 10/2017 | Liu et al. | |
| 2020/0351975 | A1 | 11/2020 | Tseng et al. | |
| 2022/0038139 | A1* | 2/2022 | Eriksson Löwenmark | H04W 72/23 |
| 2022/0086786 | A1* | 3/2022 | Narasimha | H04B 7/18506 |
| 2022/0217782 | A1* | 7/2022 | Nishio | H04B 7/1851 |

FOREIGN PATENT DOCUMENTS

| | | |
|---|---|---|
| EP | 3153886 B1 | 4/2020 |
| JP | 2003529084 A | 9/2003 |
| JP | 2014053833 A | 3/2014 |
| WO | 01/73467 A2 | 10/2001 |
| WO | 2020/005763 A1 | 1/2020 |
| WO | 2020/031043 A1 | 2/2020 |
| WO | 2020/169048 A1 | 8/2020 |
| WO | 2020/231952 A1 | 11/2020 |

OTHER PUBLICATIONS

Office action received for corresponding Japanese Patent Application No. 2023-553626, dated Sep. 24, 2024, 2 pages of office action and 7 pages of translation/summary available.

Extended European Search Report received for corresponding European Patent Application No. 21928588.9, dated Oct. 31, 2024, 9 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-40.

"Remaining details on Random access for NTN", 3GPP TSG-RAN WG2 #108, R2-1915567, Agenda: 6.6.3.1, Ericsson, Nov. 18-22, 2019, pp. 1-7.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; Physical layer procedures for control (Release 16)", 3GPP TS 38.213, V16.3.0, Sep. 2020, pp. 1-179.

Kodheli et al., "Integration of Satellites in 5G through LEO Constellations", IEEE Global Communications Conference, Dec. 4-8, 2017, 6 pages.

"IEEE 802.11", Wikipedia, Retrieved on Sep. 1, 2023, Webpage available at : https://en.wikipedia.org/wiki/IEEE_802.11.

International Search Report and Written Opinion received for corresponding Patent Cooperation Treaty Application No. PCT/CN2021/079387, dated Dec. 1, 2021, 9 pages.

"Feature lead Summary on enhancements on UL time and frequency synchronization for NR NTN", 3GPP TSG-RAN WG1 Meeting #102-e, R1-20xxxxx, Agenda: 8.4.2, Thales, Aug. 17-28, 2020, pp. 1-35.

"Enhancement to time and frequency synchronization for NB-IoT/eMTC over NTN", 3GPP TSG RAN WG1 #106, R1-2107173, Agenda: 8.15.1, Nokia, Aug. 16-27, 2021, 14 pages.

\* cited by examiner

MECHANISM FOR AVAILABILITY OF SYSTEM BROADCASTED INFORMATION

RELATED APPLICATION

This application was originally filed as a Patent Cooperation Treaty Application No. PCT/CN2021/079387 filed on Mar. 5, 2021, which is incorporated herein by reference in its entirety.

FIELD

Embodiments of the present disclosure generally relate to the field of telecommunication and in particular, to methods, devices, apparatuses and computer readable storage medium for availability of system broadcasted information.

BACKGROUND

The third generation partnership project (3GPP) has supported technologies of new radio (NR) on non-terrestrial networks (NTN). To support the NR radio access for satellite links, long round-trip delay is one issue to be addressed. For example, user equipment (UE) can pre-compensate in time domain and/or frequency domain in uplink (UL) transmission. According to whether UE can pre-compensate an estimated delay in UL transmissions, 3GPP has identified two types of UEs.

SUMMARY

In general, example embodiments of the present disclosure provide a solution for availability of system information.

In a first aspect, there is provided a first device. The first device comprises at least one processor; and at least one memory including computer program codes; the at least one memory and the computer program codes are configured to, with the at least one processor, cause the first device to trigger a validity timer of system broadcasted information which is used for deriving a compensation on a transmission between the first device and a second device in a time and/or frequency domain; determine whether the system broadcasted information is valid for the compensation before an expiration of the validity timer; in accordance with a determination that the system informing is valid, transmit, to the second device, validity information indicating that the system broadcasted information is valid; and rest the validity timer.

In a second aspect, there is provided a second device. The second device comprises at least one processor; and at least one memory including computer program codes; the at least one memory and the computer program codes are configured to, with the at least one processor, cause the second device to trigger a validity timer of system broadcasted information which is used for deriving a compensation on a transmission between a first device and the second device in a time and/or frequency domain by a first device; receive, from the first device, validity information indicating that the system broadcasted information is valid; and reset the validity timer.

In a third aspect, there is provided a method. The method comprises triggering a validity timer of system broadcasted information which is used for deriving a compensation on a transmission between the first device and a second device in a time and/or frequency domain; determining whether the system broadcasted information is valid for the compensation before an expiration of the validity timer; in accordance with a determination that the system informing is valid, transmitting, to the second device, validity information indicating that the system broadcasted information is valid; and resetting the validity timer.

In a fourth aspect, there is provided a method. The method comprises triggering, at a second device, a validity timer of system broadcasted information which is used for deriving a compensation on a transmission between a first device and the second device in a time and/or frequency domain by a first device; receiving, from the first device, validity information indicating that the system broadcasted information is valid; and resetting the validity timer.

In a fifth aspect, there is provided an apparatus. The apparatus comprise means for triggering a validity timer of system broadcasted information which is used for deriving a compensation on a transmission between the first device and a second device in a time and/or frequency domain; means for determining whether the system broadcasted information is valid for the compensation before an expiration of the validity timer; means for in accordance with a determination that the system informing is valid, transmitting, to the second device, validity information indicating that the system broadcasted information is valid; and means for resetting the validity timer.

In a sixth aspect, there is provided an apparatus. The apparatus comprises means for triggering, at a second device, a validity timer of system broadcasted information which is used for deriving a compensation on a transmission between a first device and the second device in a time and/or frequency domain by a first device; means for receiving, from the first device, validity information indicating that the system broadcasted information is valid; and means for resetting the validity timer.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
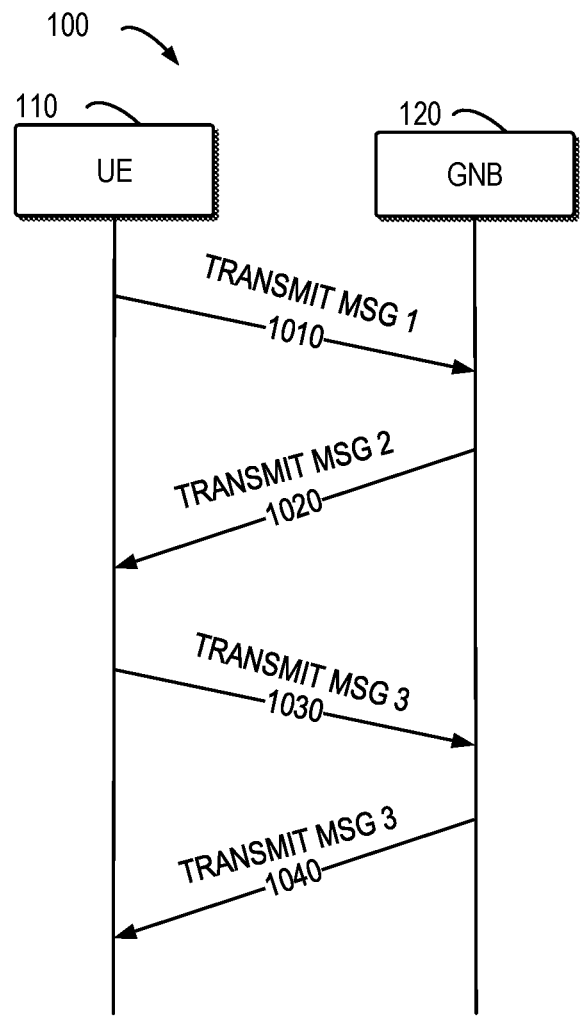
FIG. 1 illustrates a signaling flow for a random access procedure according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, according to whether UE can pre-compensate an estimated delay in UL transmissions, 3GPP has identified two types of UEs. Specifically, type 1 UE can refer to a UE with capability of timing advance (TA) pre-compensation and type 2 UE can refer to a UE without capability of TA pre-compensation. The term "timing advance (TA)" used herein refer to a technology that can compensate for propagation delay as a signal travels between a UE and a base station (BS) or between a UE and a satellite.

FIG. 1 shows a signaling flow for a random access procedure according to conventional technologies. As shown in FIG. 1, UE 110 can transmit 1010 message (Msg) 1 (for example, a preamble) to gNB 120. The gNB can transmit 1020 Msg2 to the UE 110. The UE 110 can transmit 1020 Msg3 to the gNB 120 and the gNB 120 can transmit Msg4 to the UE 110. If the UE 110 is a type 1 UE, the UE 110 should first estimate a timing advance (TA) with respect to the gNB based on received system broadcasted information (for example, global navigation satellite system (GNSS) information) before sending Msg1. The UE 110 can apply the estimated TA in the transmission of Msg1. The gNB 120 can determine the TA adjustment based on the UE's 110 TA estimation.

Figure 2A:
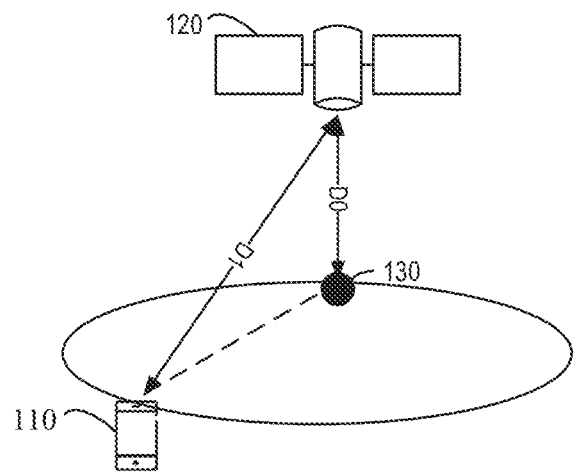
FIGS. 2A and 2B illustrate schematic diagrams of timing advance (TA) calculation according to conventional technologies, respectively.
Figure 2B:
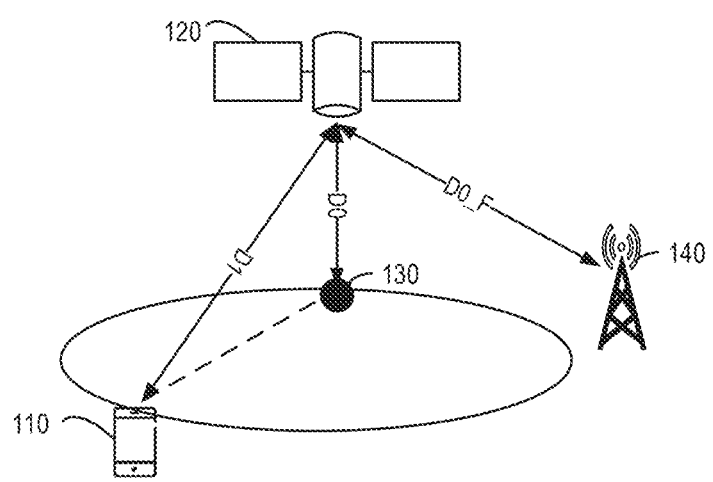

If the UE 110 is a type 2 UE, the UE 110 cannot estimate the timing advance with respect to the gNB 120. This can happen for UE which has no GNSS capability or UE whose GNSS signal is not available due to the bad channel condition or UE whose GNSS information is temporarily out of accuracy requirement (e.g., UE is moving to indoor coverage). In this case, the gNB 120 may need to broadcast a common TA, where the common TA value is feeder link's TA plus a minimum service link's TA corresponding to a terrestrial referent point. The UE 110 can apply the broadcasted common TA to send Msg1. FIGS. 2A and 2B illustrate schematic diagrams of TA calculation, respectively.

FIG. 2A shows TA calculation for regenerative payload. In this case, UE specific TA can be obtained based on:

$$UE \text{ specific } TA = 2*(D1-D0)/C \quad (1)$$

where D1 represents a distance between the UE 110 and the gNB 120, D0 represents a distance between the gNB 120 and a reference point 130, and C represents the speed of light.

Common reference TA broadcasted by the gNB can be:

$$\text{Common reference } TA = 2*D0/C \quad (2)$$

where D0 represents a distance between the gNB 120 and a reference point 130, and C represents the speed of light.

FIG. 2B shows TA calculation for bent-pipe payload. A bent pipe configuration means that a satellite is operating like a relay taking whatever comes up to it and sending it back down to earth with no changes. In this case, UE specific TA can be obtained based on:

$$UE \text{ specific } TA = 2*(D1-D0)/C \quad (3)$$

where D1 represents a distance between the UE 110 and the relay device (120, D0 represents a distance between the relay device 120 and a reference point 130, and C represents the speed of light.

Common reference TA broadcasted by the gNB can be:

$$\text{Common reference } TA = 2*(D0+D0\_F)/C \quad (4)$$

where D0 represents a distance between the relay device 120 and a reference point 130, D0_F represents a distance between the relay device 120 and a network device 140 on the earth, and C represents the speed of light.

Since a UE can be with pre-compensation capability or without pre-compensation capability, UE can apply different TAs and the physical random access channel (PRACH) resource allocation has different restriction. For example, for UEs without capability of timing advance pre-compensation, preamble receiving window at network (NW) should be at least 2 times of the maximum differential delay within a cell. In order to avoid the preamble receiving windows between successive RACH occasions (RO) overlapping, PRACH configuration should ensure that the time interval between two consecutive RO is larger than 2 times the maximum differential delay within a cell. (i.e., sparse PRACH configuration should be configured). For UEs with capability of timing advance pre-compensation, such restriction is not needed.

So, if there are both type of UEs co-exist in the same cell, the PRACH resource should be configured separately for UE with and without pre-compensation capability. On top of this PRACH design, NW can distinguish different type of UE and thus schedule and handle the UE in separate way.

Further, for UE with pre-compensation capability, another topic is how to schedule physical uplink shared channel (PUSCH) including both Msg3 on PUSCH during RACH procedure and the unicast data on PUSCH when UE is in RRC Connected state. There are two possible way forward according to 3GPP offline discussion:

Option1: NW schedule PUSCH using TA equal to the maximum RTT of UEs in the cell. As UE may locate in cell's coverage center as well as cell edge, for simplicity, PUSCH can be scheduled using the maximum round trip time (RTT) to make sure all UE have sufficient TA to transmit PUSCH.

Option2: NW schedule PUSCH using TA equal to the maximum RTT of UEs to be scheduled in current scheduling TTI. PUSCH can also be scheduled using the maximum possible value of RTT among all the UEs in current scheduling TTI (instead of all the UEs in the cell), to save the UE's scheduling delay.

For Option1, maximum RTT can be broadcasted in the cell so that all UEs know this value. For Option2, each UE need to report its UE-estimated TA to NW thus NW can decide the value of maximum RTT of UEs to be scheduled in "current" TTI.

3GPP has no decision on what solution should be adapted while radio access network (RAN)2 has decided to discuss whether UE should report UE-calculated TA (i.e., UE-estimated TA) to NW to enable Option2.

However, Option2 will reduce PUSCH's coverage. With information of value of TA applied by UE added to e.g. MsgA PUSCH as overhead, there is a significant increase the MsgA PUSCH payload size which will reduce PUSCH's coverage in the end.

Thus, both Option1 and Option2 should be supported in NTN which leave the flexibility to NW to balance the PUSCH overhead (i.e., PUSCH coverage) and the PUSCH scheduling delay. For example, for scenarios where the cell size is small enough to limit all UE's differential RTT (where the differential RTT from all UEs in the cell is not very large and close to the maximum RTT of the cell) or UE has no time critical service, UE should be scheduled as Option1. Otherwise, Option2 can be adopted.

To support Option1, there are some discussions in 3GPP on how to make sure NW can receive all the PUSCH transmissions from different UEs in the same slot (e.g. slot n) if the NW schedules these UEs in the same scheduling slot (e.g. slot m), where the distance between slot m and slot n equal to fixed value (e.g. max_TA or max_TA+NW indicated offset).

According to current NW implementation principles in terrestrial network, one basic rule is that: when NW schedules a group of UEs in the same DL scheduling slot (e.g. slot m), NW expects all the PUSCH transmissions from these UEs should arrive gNB in the same UL PUSCH slot (e.g.

slot n). Otherwise, it will be very complex for NW to schedule UEs, because it has to consider not only UE to be scheduled in current scheduling slot, but also the UE (already) scheduled in previous slots and check if the scheduled UEs from different scheduling slot have same PUSCH transmission slot. (e.g., both slot m and slot m−1 will schedule UEs transmission in slot n).

Figure 3:
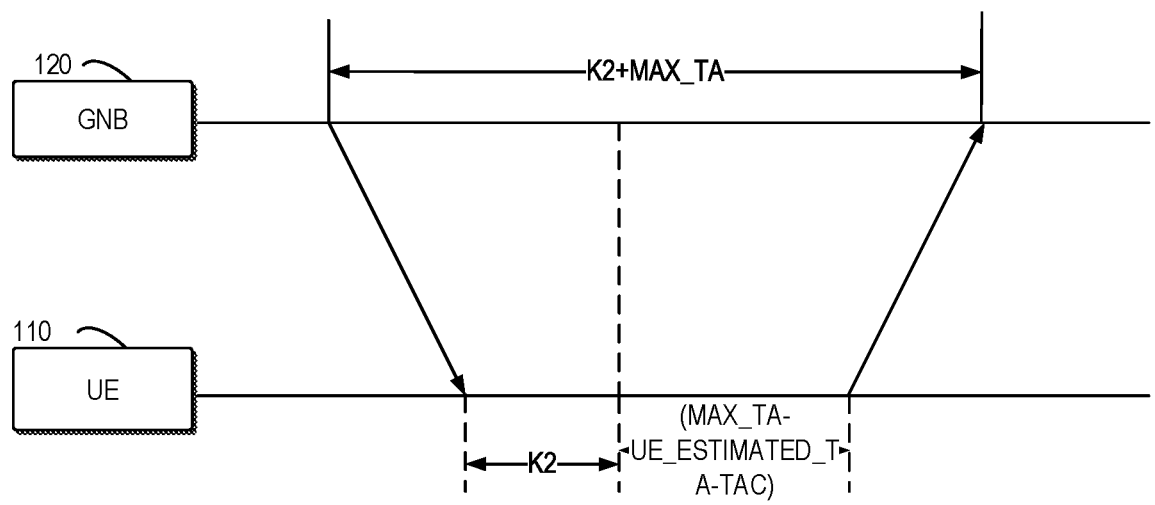
FIG. 3 illustrates a schematic diagram of physical uplink shared channel (PUSCH) scheduling from different UEs according to conventional technologies.

To fulfill this rule in NTN, UE needs to automatically adjust its transmission time in PUSCH transmission based on its UE estimated TA. In this case, for example as shown in FIG. 3, the PUSCH could be scheduled based on the maximum RTT in the cell:

$$(UE\_TX\ slot - UE\_RX\ slot) = K2 + (\max\_TA - UE\_TA) \qquad (5)$$

where K2 represents the scheduling offset of PUSCH signaled in DCI grant.

In other words, max_TA can be broadcast in the cell so that all UEs know this value. When the UE 110 receives DCI in slot m, the UE 110 would transmit PUSCH in slot n, where n is equal to m+k2+Delta. Here Delta=(max_TA−UE_TA)=(max_TA−UE_estimated_TA−TAC), where TAC is the value of timing advance command received by UE from gNB. With this, gNB 120 will receive all the PUSCH transmissions from different UEs after max_TA+k2 slots have passed since the gNB sent DCI 0.

As mentioned in previous discussion, UE estimates the timing advance with respect to the satellite before UE sending Msg1 based on UE received GNSS information (e.g. GNSS location or GNSS timestamp information). Such GNSS information can be received by use of a GNSS device, which can be functioning without a connection to a 3GPP/cellular radio network. However, Option1 may have problem if the information can be outdated or the UE cannot obtain a new accurate estimate.

For UE without pre-compensation capability, the PUSCH scheduling can follow legacy handling in terrestrial network (i.e. rely on the TA commands from network side for UL alignment).

In a NTN system which supports both UE with timing pre-compensation and without pre-compensation capability (e.g. Type1 or Type2 UE), before sending Msg1 to the access system, UE should determine the GNSS availability status and select corresponding dedicated PRACH resource to access NW. According to the selected preamble resource, gNB can identify UE Type thus can set proper preamble receiving window, offset to start ra-ResponseWindow during RACH procedure. After that, gNB can schedule PUSCH for the UE.

For UE with pre-compensation capability, when UE is scheduled with PUSCH, UE needs to automatically adjust its transmission time in PUSCH transmission based on its UE_estimated_TA (and TAC command value based on UE-estimated TA). The autonomous adjusted transmission time Delta equals to (max_TA−UE_estimated_TA−TAC).

However, when UE is in RRC Connected state, UE with GNSS capability (and timing pre-compensation capability) may not able to calculate TA correctly because its GNSS information is not reliable anymore. For example, UE is moving from outdoor to indoor coverage, and its GNSS signal is not available due to the bad channel condition or the GNSS information is temporarily out of accuracy requirement for timing estimation. (i.e., GNSS info status switch from available to un-available).

Figure 6:
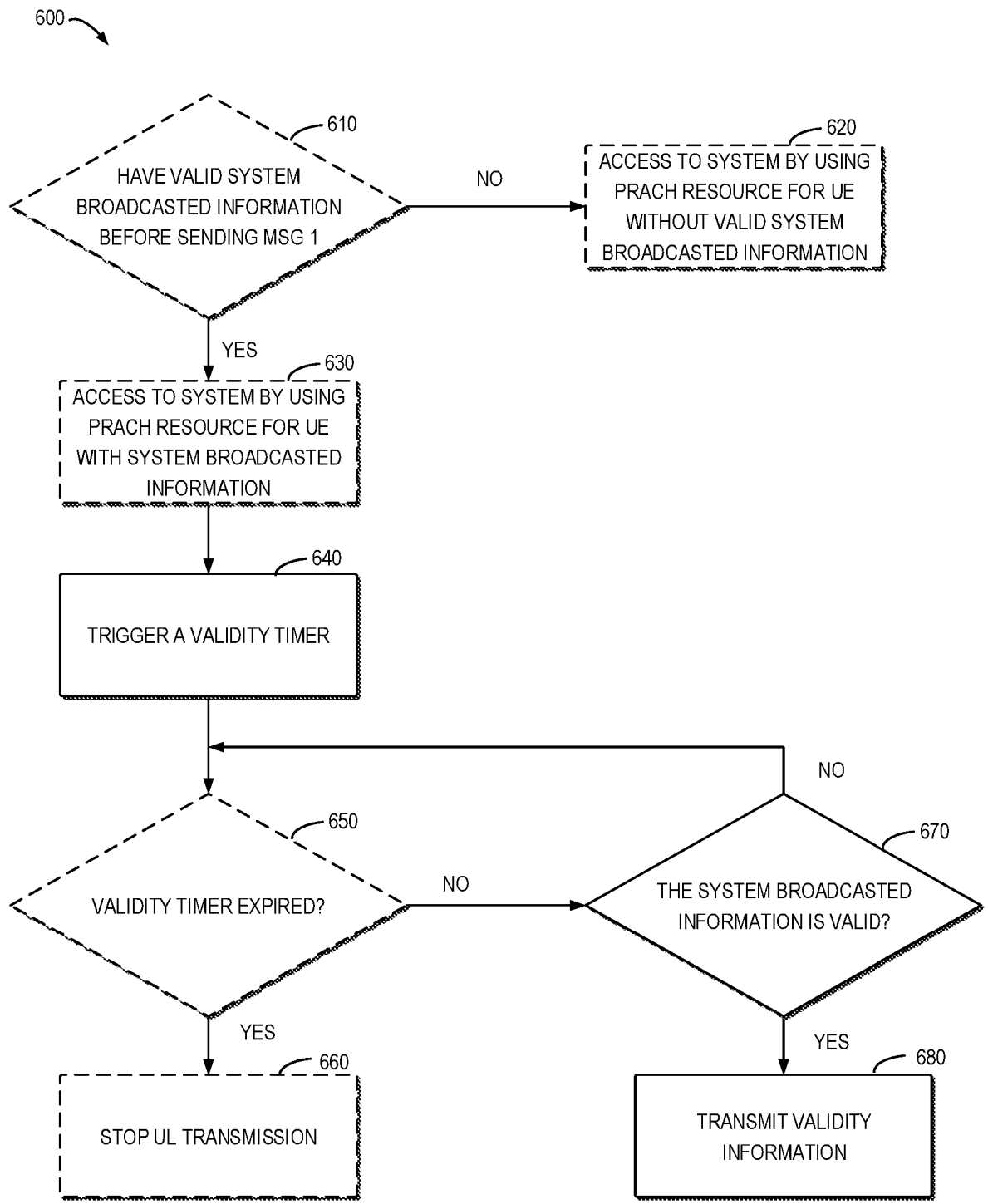
FIG. 6 illustrates a flowchart of a method implemented at a first apparatus according to some example embodiments of the present disclosure.

If the UE_estimated_TA is not correct anymore, this will cause interferences between different UEs, for example, the timing mis-alignment in PUSCH receiving between different UEs, which is opposite to FIG. 6 and UE1, UE2 are not aligned in gNB receiving anymore. If the delta is larger than the cyclic prefix (e.g., UE is fast moving along with NTN cell mobility), interference will happen, which will downgrade system performance.

Additionally, if GNSS information is lost or not accurately received for at least Low-Earth Orbit (LEO) scenario, frequency synchronization cannot be acquired or updated/tracked which will cause inter-UE interference if the UE with adjacent physical resource block (PRB) for PUSCH transmission. This will downgrade system performance as well.

In order to solve at least part of the above problems, a solution for availability of system broadcasted information is proposed. According to embodiments of this present disclosure, a validity timer for system broadcasted information is introduced to guarantee the system broadcasted information is valid to pre-compensate in time and/or frequency domain when the timer is running. In this way, the UE can be scheduled with correct timing estimation in UL transmission.

Figure 4:
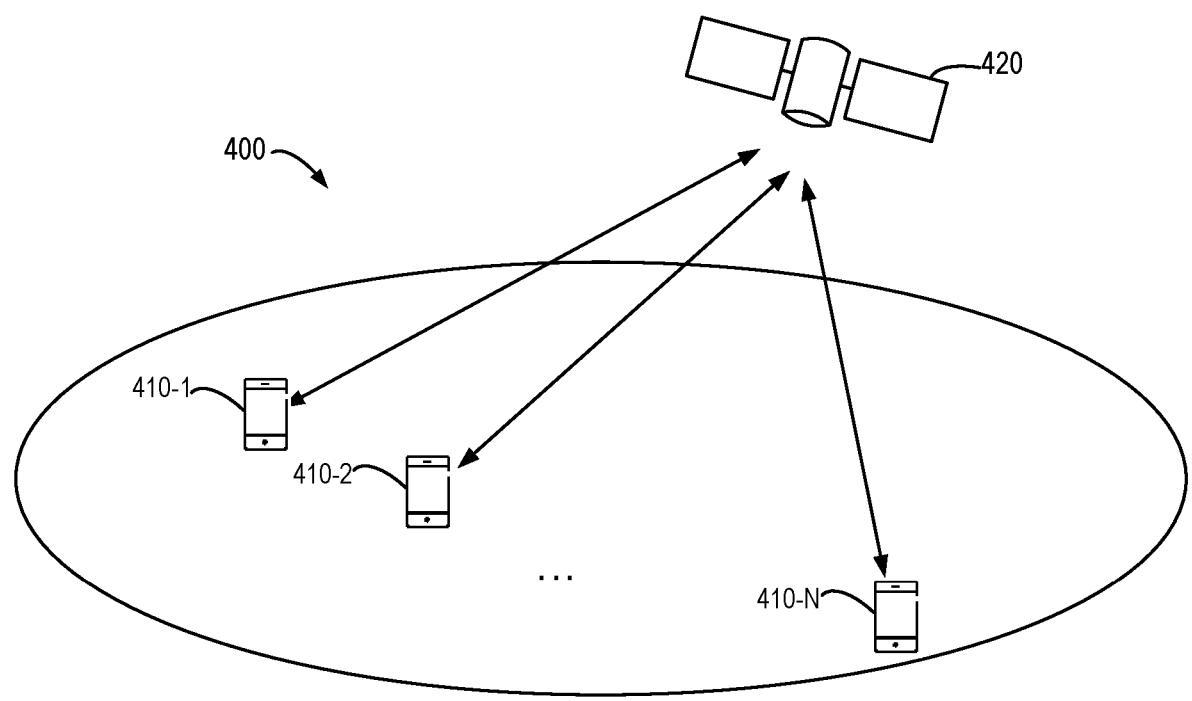
FIG. 4 illustrates an example communication environment in which example embodiments of the present disclosure can be implemented.

FIG. 4 illustrates a schematic diagram of a communication environment 400 in which embodiments of the present disclosure can be implemented. The communication environment 400, which is a part of a communication network, further comprises a device 410-1, a device 410-2, . . . , a device 410-N, which can be collectively referred to as "first device(s) 410." The communication environment 400 comprises a second device 420.

The communication environment 400 may comprise any suitable number of devices and cells. In the communication environment 400, the first device 410 and the second device 420 can communicate data and control information to each other. In the case that the first device 410 is the terminal device and the second device 420 is the network device, a link from the second device 420 to the first device 410 is referred to as a downlink (DL), while a link from the first device 410 to the second device 420 is referred to as an uplink (UL). In some embodiments, the regenerative architecture can be applied to the communication environment 400. Alternatively, a bent-pipe architecture can be applied to the communication environment 400.

It is to be understood that the number of first devices and cells and their connections shown in FIG. 4 is given for the purpose of illustration without suggesting any limitations. The communication environment 400 may include any suitable number of devices and networks adapted for implementing embodiments of the present disclosure.

Communications in the communication environment 400 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 5:
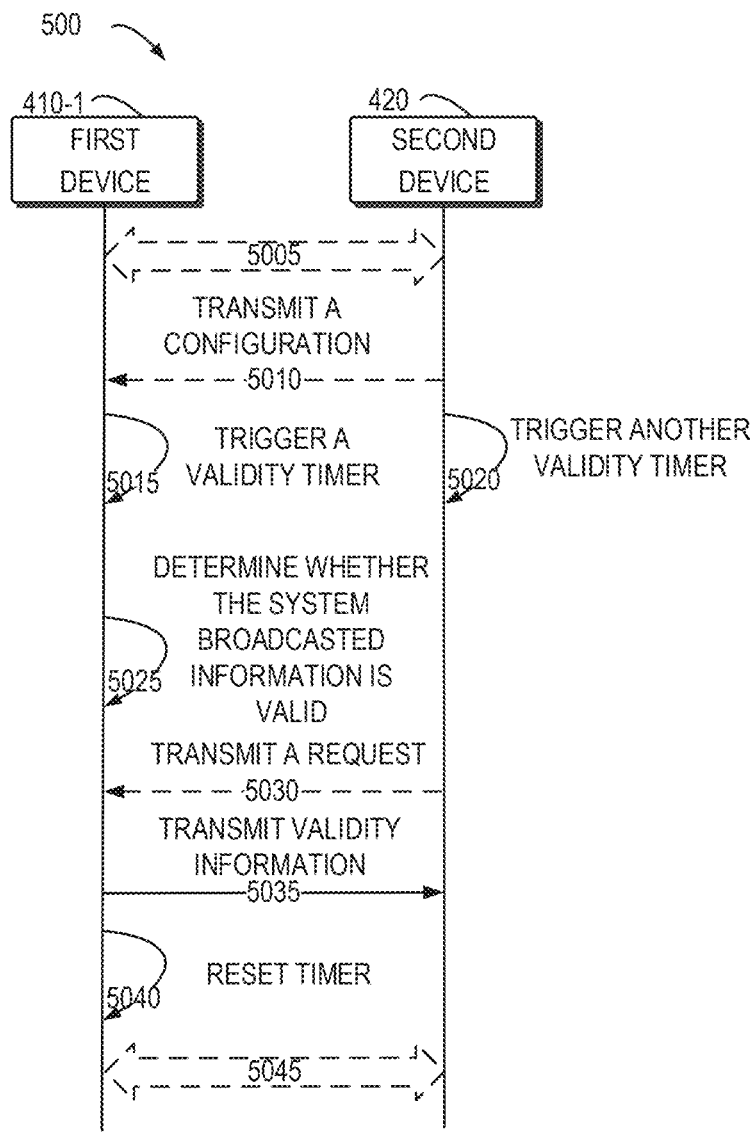
FIG. 5 illustrates a signaling flow for a validity timer synchronization procedure according to some example embodiments of the present disclosure.

Example embodiments of the present disclosure will be described in detail below with reference to the accompanying drawings. Reference is now made to FIG. 5, which illustrates a signaling flow 500 for a validity timer synchronization procedure according to example embodiments of the present disclosure. For the purpose of discussion, the signaling flow 500 will be described with reference to FIG. 4. Only for the purpose of illustrations, the signaling flow 500 may involve the first device 410-1 and the second device 420.

The first device 410-1 can perform 5005 a random access procedure with the second device 420. In some embodiments, the first device 410-1 can perform 4-step random access procedure. Alternatively, the first device 410-1 can perform 2-step random access procedure.

In some embodiments, the second device 420 can configure a validity timer for system broadcasted information. In some embodiments, the system broadcasted information can comprise GNSS location information provided by global navigation satellite system. Alternatively or in addition, the system broadcasted information can comprise GNSS timestamp information provided by global navigation satellite system. In this case, the second device 420 can transmit 5010 a configuration of the validity timer to the first device 410-1. For example, the configuration may indicate a duration of the validity timer. In other embodiments, the validity timer can be pre-configured at the first device 410-1. In some embodiments, the validity timer can be a UE-specific timer. In this case, the configuration of the validity timer can be transmitted to the first device 410-1 via a radio resource control (RRC) signaling. Alternatively or in addition, the validity timer can be common to UEs. In this situation, the configuration of the validity timer can be broadcasted to one or more first devices. In other embodiments, the second device 420 can transmit the configuration indicating a threshold accuracy of the system broadcasted information. Alternatively or in addition, the configuration can indicate a validity information update periodicity.

In some embodiments, the duration of the timer can be determined based on a signal-to-noise ratio (SNR) between the first device 410-1 and the second device 420. Alternatively or in addition, the duration of the timer can be determined based on quality of a channel between the first device 410-1 and the second device 420.

The first device 410-1 triggers 5015 the validity timer. The term "validity timer" used herein refers to a timer during which the system broadcasted information should be valid for deriving compensations in time and/or frequency domain. For example, in some embodiments, the system broadcasted information should be valid to estimate timing advance when the validity timer is running. Alternatively or in addition, the system should be valid to estimate frequency shift when the validity timer is running. In some embodiments, the validity timer can be triggered at a first time when the first device 410-1 receives valid system broadcasted information. In some embodiments, the validity timer can be implicitly triggered after the random access procedure successfully completes. In some embodiments, the first device 410-1 may transmit an explicit indication to trigger another validity timer at the second device 420. In this way, it guarantees system performance.

The second device 420 triggers 5020 another validity timer at the second device 420. In some embodiments, the first device 410-1 can transmit a start indication to the second device, and the second device 420 may trigger the other validity timer based on the start indication. The second device 420 may trigger the other validity timer based on the indication. The indication can be implicit or explicit. For example, in some embodiments, the other validity timer can be implicitly triggered after the random access procedure successfully completes. In some embodiments, to ensure that the validity timers at the first device 410-1 and the second device 420 can be started, reset and stopped at the same time, the first device 410-1 can apply an offset to its validity timer. The offset can be a value accounting for RTT and processing delays. The validity timer at the first device 410-1 and the other validity timer at the second device 420 can start simultaneously.

The first device 410-1 determines 5025 whether the system broadcasted information is valid. In some embodiments, the first device 410-1 can determine whether the system broadcasted information is valid in advance of the start of validity timer. Alternatively, the first device 410-1 can determine whether the system broadcasted information is valid within the validity timer. In other embodiments, the first device 410-1 can determine whether the system broadcasted information is valid periodically. In some embodiments, the first device 410-1 may determine a change in signal power from GNSS information provided by global navigation satellite system. If the change exceeds a threshold change, the first device 410-1 can determine that the system broadcasted information is invalid. The threshold change may be different for compensation in time domain and compensation in frequency domain. In other embodiments, the first device 410-1 can monitor current TA level. In this case, if a difference among the system broadcasted information-based estimations of the TAs is more than a threshold, the system broadcasted information is invalid. Alternatively, if the system broadcasted information based estimation of the TA indicates a large step, it means that the location or timestamp estimate is wrong. In other embodiments, if a difference among the system broadcasted information-based estimations of the frequency shifts is more than a threshold, the system broadcasted information is invalid. Only as an example, the first device 410-1 can determine an accuracy of the system broadcasted information. For example, if the system broadcasted information is GNSS, the first device 410-1 can determine the accuracy of the GNSS. In this case, if the accuracy of the GNSS exceeds a threshold accuracy, the first device 410-1 can determine that the GNSS is valid.

If the system broadcasted information is valid, the first device 410-1 transmits 5035 validity information indicating that the system broadcasted information is valid. In some embodiments, the second device 420 may transmit 5030 a request for the validity information. The first device 410-1 can transmit the validity information after receiving that request. Alternatively, the first device 410-1 can transmit the validity information regularly. For example, the validity information can be transmitted at a predetermined period. The predetermined period can be determined at the first device 410-1. Alternatively, the predetermined period can be determined by the second device 420. In other embodiments, the first device 410-1 can transmit the validity information on-demand to guarantee the other validity timer at the second device 420 not expired. In other embodiments, the first device 410-1 can transmit the validity information if a condition that causes changing validity of the system broadcasted information is fulfilled. For example, if the first device 410-1 moves from indoor to outdoor, the first device 410-1 can transmit the validity information. It should be noted that the condition can be any suitable conditions that can change the validity of the system broadcasted information. In this way, it guarantees accuracy of estimations of TA and/or frequency shift. The first device 410-1 resets 5040 the validity timer after transmitting the validity information.

In some embodiments, the validity information can indicate that the system broadcasted information is valid for TA estimation. Alternatively or in addition, the validity information can indicate more validation status. For example, the validity information can indicate that the system broadcasted information is valid for frequency compensation. The validity information can comprise an indication on whether the system broadcasted information is valid for the compensation in time domain. In other embodiment, the validity information can comprise an indication on whether the system broadcasted information is valid for the compensation in frequency domain. Alternatively or in addition, the validity information can comprise a currently used timing advance. In other embodiments, the validity information can comprise a currently used frequency shift. The validity information can also indicate last time when accurate system broadcasted information was received by the first device 410-1.

In some embodiments, the validity information can be transmitted in a medium access control (MAC) control element (CE). The MAC CE can be transmitted on a physical uplink shared channel (PUSCH). For example, the MAC CE can be sent in uplink control information. Alternatively, the validity information can be transmitted together with other transmissions, which can save energy. For example, the validity information can be transmitted in a channel quality indicator (CQI) report.

In some embodiments, the validity information can be transmitted in a scheduling request (SR). Alternatively or in addition, the validity information can be transmitted in a hybrid automatic repeat request (HARM) feedback. In other embodiments, the validity information can be transmitted in other UL transmission. For example, the validity information can be transmitted in a RRC signaling between the first device 410-1 and the second device 420. The validity information can be transmitted implicitly. For example, if the SR transmitted by the first device 410-1 is well time aligned with the second device 420, the second device 420 can determine that the system broadcasted information is valid. Similarly, if the HARQ feedback or UL transmission is time aligned with the second device 420, the system broadcasted information can be determined to be valid. After the second device 420 determines that the system broadcasted information is valid, the second device 420 can reset the timer at the second device 420.

In some embodiments, the first device 410-1 can determine an accuracy of the system broadcasted information. If the accuracy of the system information is below a threshold accuracy, the first device 410-1 can suspend transmitting the validity information to the second device 420. Alternatively or in addition, the first device 410-1 can suspend the transmission between the first device 410-1 and the second device 420. For example, the first device 410-1 can stop sending data to the second device 420. Alternatively, the first device 410-1 can stop the random access to the second device 420. In some embodiments, if a change of a timing advance estimated based on the system broadcasted information exceeds a threshold change, the accuracy of the system broadcasted information can be determined to be below the threshold accuracy. For example, the first device can monitor the current TA level and if the system broadcasted information based estimate suddenly differs more than a threshold, the accuracy is degraded. Alternatively, if the timing advance estimated based on the system broadcasted information indicates a step exceeding a threshold step, the accuracy of the system broadcasted information can be determined to be below the threshold accuracy. For example, if the system broadcasted information based TA estimate indicates a large step compared to a previously estimated TA value or within a time window, it means the location or timestamp estimate is wrong. In other embodiments, if the first device 410-1 moves from outdoor to indoor, the accuracy of the system broadcasted information can be determined to be below the threshold accuracy. As mentioned above, the threshold accuracy can be provided to the first device 410-1 by the second device 420.

In addition, the first device 410-1 may detect the system broadcasted information is inaccurate, for example, if the first device 410-1 has moved indoors. In this case, if the validity timer is still running, the first device 410-1 may apply a previously valid TA (for example, from within the last x seconds) for uplink transmission instead of using the value derived from inaccurate system broadcasted information obtained at the indoor location, since the previous system broadcasted information related to the previously valid TA is valid while the currently system broadcasted information is not correct.

In other embodiments, if the accuracy of the system broadcasted information is above the threshold accuracy, the first device 410-1 can transmit an indication to the second device 420 to restart the other validity timer at the second device 420. In this situation, the first device 410-1 can also reset the validity timer at the first device 410-1. For example, a timer recovery mechanism can be defined at the first device 410-1. For example, if the first device 410-1 moves from indoors to outdoors, the accuracy of the system broadcasted information can be determined to be recovered. In this case, the first device 410-1 can send a notification to network to reset the other validity timer at the second device 420. The validity timer at the first device 410-1 can be reset as well after transmitting the above validity information.

In some embodiments, if the validity timer at the first device 410-1 is expired, the first device 410-1 may stop transmit data to avoid interferences to other devices. In this case, the first device 410-1 can select one or more PRACH resources which are reserved for the UE without pre-compensation capability. The first device 410-1 can initiate 5045 another random access procedure with the second device 420.

Furthermore, on top of TA estimation, the validity timer can also be utilized to cover the system broadcasted information is valid to achieve UL frequency synchronization. The first device 410-1 can maintain the validity timer and send the validity information to the second device 420 if its system broadcasted information is valid to both TA estimation and UL frequency synchronization, in order to synchronize with the second device 420 that the system broadcasted information is valid in the first device 410-1 for both TA and UL frequency synchronization. In the UL frequency synchronization case, if the validity timer is expired in the first device 410-1, the first device 410-1 should not perform random access again to avoid inter-UE interference in PRBs (frequency domain). Similarly, if the validity timer is expired in the second device 420, the second device 420 can choose not to send PDCCH order and ask the first device 410-1 do PRACH again.

In some embodiments, if the other validity timer is expired at the second device 420, the second device 420 can stop scheduling the first device 410-1 for UL transmissions. In addition, the second device 420 may send PDCCH order for initiating another random access procedure. As mentioned above, the first device 410-1 can do PRACH again as UE without valid system broadcasted information and the first device 410-1 can select PRACH resource reserved for UE without GNSS information (i.e. UE without pre-compensation capability).

In some embodiments, depending on the estimated TA drift based on uplink reception, the second device 420 may also send MAC level command towards the first device 410-1 to start system broadcasted information based timing adjustment earlier than the validity timer expiry. For example, in the scenarios where the first device 410-1 is also fast moving along with NTN cell mobility such as maritime or high speed train scenario, the second device 420 can transmit, to the first device 410-1, an indication to start a timing adjustment based on the system broadcasted information before the expiration of the validity timer. Alternatively or in addition, the second device 420 can transmit, to the first device 410-1, the indication to start a frequency adjustment based on the system broadcasted information.

In some embodiment, the second device 420 may include one additional bit in the TA command MAC IE to indicate the first device 410-1 to trigger system broadcasted information based timing synchronization in connected mode. In this case, if the first device 410-1 cannot simultaneously operate GNSS and cellular radio (for example, IoT or enhanced mobile broadband (eMBB)), the second device 420 can also create scheduling gap to complete the GNSS operation.

Embodiments of the present disclosure can avoid inter-UE interference in UL transmissions (e.g. PUSCH) when the system broadcasted information is not reliable, which is to facilitate NW work well and guarantee system performance. Embodiments of the present disclosure can also enable UE to access system again when the system broadcasted information is not available thus enable UE can be served again in the system. Embodiments of the present disclosure introduce NW controlled mechanism with dedicated system broadcasted information availability guard timer and periodical check timer in UE, as well as parameters on how UE detects the system broadcasted information accuracy has degraded.

FIG. 6 shows a flowchart of an example method 600 in accordance with some example embodiments of the present disclosure. For the purpose of discussion, the method 600 will be described from the perspective of the first device 410.

In some embodiments, at block 610, the first device 410-1 can determine whether the first device 410-1 has valid system broadcasted information before transmitting Msg1. If there is no valid system broadcasted information, at bock 620, the first device 410-1 can access to the second device 420 using PRACH resources reserved for UE without valid system broadcasted information.

If there is valid system broadcasted information, at block 630, the first device 410-1 can access to the second device 420 using PRACH resources reserved for UE with system broadcasted information. In some embodiments, the first device 410-1 can perform 4-step random access procedure. Alternatively, the first device 410-1 can perform 2-step random access procedure.

In some embodiments, the second device 420 can configure a validity timer for system broadcasted information. In some embodiments, the system broadcasted information can comprise GNSS location information provided by global navigation satellite system. Alternatively or in addition, the system broadcasted information can comprise GNSS timestamp information provided by global navigation satellite system. In this case, the first device 410-1 can receive a configuration of the validity timer from the second device 420. For example, the configuration may indicate a duration of the validity timer. In other embodiments, the validity timer can be pre-configured at the first device 410-1. In some embodiments, the validity timer can be a UE-specific timer. In this case, the configuration of the validity timer can be transmitted to the first device 410-1 via a radio resource control (RRC) signaling. Alternatively or in addition, the validity timer can be common to UEs. In this situation, the configuration of the validity timer can be broadcasted to one or more first devices.

In some embodiments, the duration of the timer can be determined based on a signal-to-noise ratio (SNR) between the first device 410-1 and the second device 420. Alternatively or in addition, the duration of the timer can be determined based on quality of a channel between the first device 410-1 and the second device 420.

At block 640, the first device 410-1 triggers the validity timer. For example, in some embodiments, the system broadcasted information should be valid to estimate timing advance when the validity timer is running. Alternatively or in addition, the system should be valid to estimate frequency shift when the validity timer is running. In some embodiments, the validity timer can be triggered at a first time when the first device 410-1 receives valid system broadcasted information. In some embodiments, the validity timer can be implicitly triggered after the random access procedure successfully completes. In some embodiments, the first device 410-1 may transmit an explicit indication to trigger another validity timer at the second device 420. In this way, it guarantees system performance.

In some embodiments, at block 650, the first device 410-1 can determine whether the validity timer is expired. If the validity timer at the first device 410-1 is expired, the first device 410-1 may, at block 660, stop transmit data to avoid interferences to other devices. In this case, the first device 410-1 can select one or more PRACH resources which are reserved for the UE without valid system broadcasted information. The first device 410-1 can initiate another random access procedure with the second device 420.

If the validity timer at the first device 410-1 is expired, at block 670, the first device 410-1 determines whether the system broadcasted information is valid. In some embodiments, the first device 410-1 may determine a change in signal power from the second device 420. If the change exceeds a threshold change, the first device 410-1 can determine that the system broadcasted information is invalid. The threshold change may be different for compensation in time domain and compensation in frequency domain. In other embodiments, the first device 410-1 can monitor current TA level. In this case, if a difference among the system broadcasted information-based estimations of the TAs is more than a threshold, the system broadcasted information is invalid. Alternatively, if the system broadcasted information based estimation of the TA indicates a large step, it means that the location or timestamp estimate is wrong. In other embodiments, if a difference among the system broadcasted information-based estimations of the frequency shifts is more than a threshold, the system broadcasted information is invalid.

If the system broadcasted information is valid, the first device 410-1 transmits, at block 680, validity information indicating that the system broadcasted information is valid. In some embodiments, the first device 410-1 may receive a request for the validity information from the second device 420. The first device 410-1 can transmit the validity information after receiving that request. Alternatively, the first device 410-1 can transmit the validity information regularly. For example, the validity information can be transmitted at a predetermined period. The predetermined period can be determined at the first device 410-1. Alternatively, the predetermined period can be determined by the second device 420. In other embodiments, the first device 410-1 can transmit the validity information on-demand to guarantee the other validity timer at the second device 420 not expired. In this way, it guarantees accuracy of estimations of TA and/or frequency shift. The first device 410-1 can reset the validity timer after transmitting the validity information.

In some embodiments, the validity information can indicate that the system broadcasted information is valid for TA estimation. Alternatively or in addition, the validity information can indicate more validation status. For example, the validity information can indicate that the system broadcasted information is valid for frequency compensation. The validity information can comprise an indication on whether the system broadcasted information is valid for the compensation in time domain. In other embodiment, the validity information can comprise an indication on whether the system broadcasted information is valid for the compensation in frequency domain. Alternatively or in addition, the validity information can comprise a currently used timing advance. In other embodiments, the validity information can comprise a currently used frequency shift. The validity information can also indicate last time when accurate system broadcasted information is received by the first device 410-1.

In some embodiments, the validity information can be transmitted in a medium access control (MAC) control element (CE). The MAC CE can be transmitted on a physical uplink shared channel (PUSCH). For example, the MAC CE can be sent in uplink control information. Alternatively, the validity information can be transmitted together with other transmissions, which can save energy. For example, the validity information can be transmitted in a channel quality indicator (CQI) report.

In some embodiments, the validity information can be transmitted in a scheduling request (SR). Alternatively or in addition, the validity information can be transmitted in a hybrid automatic repeat request (HARQ) feedback. In other embodiments, the validity information can be transmitted in other UL transmission. The validity information can be transmitted implicitly. For example, if the SR transmitted by the first device 410-1 is well time aligned with the second device 420, the second device 420 can determine that the system broadcasted information is valid. Similarly, if the HARQ feedback or UL transmission is time aligned with the second device 420, the system broadcasted information can be determined to be valid. In some embodiments, the validity information can be transmitted via a RRC signaling transmitted between the first device 410-1 and the second device 420.

In some embodiments, the first device 410-1 can determine an accuracy of the system broadcasted information. If the accuracy of the system broadcasted information is below a threshold accuracy, the first device 410-1 can stop transmitting the validity information to the second device 420. In some embodiments, the first device can monitor the current TA level and if the system broadcasted information based estimate suddenly differs more than a threshold, the accuracy is degraded. Alternatively, if the system broadcasted information based TA estimate indicates a large step, it means the location or timestamp estimate is wrong.

In addition, the first device 410-1 may detect the system broadcasted information is inaccurate, for example, if the first device 410-1 has moved indoors. In this case, if the validity timer is still running, the first device 410-1 may apply a previously valid TA (for example, from within the last x seconds) for uplink transmission instead of using the value derived from inaccurate system broadcasted information.

In other embodiments, if the accuracy of the system broadcasted information is recovered, the first device 410-1 can transmit an indication to the second device 420 to restart the other validity timer at the second device 420. In this situation, the first device 410-1 can also reset the validity timer at the first device 410-1. For example, a timer recovery mechanism can be defined at the first device 410-1. For example, if the first device 410-1 moves from indoors to outdoors, the accuracy of the system broadcasted information can be determined to be recovered. In this case, the first device 410-1 can send a notification to network to reset the other validity timer at the second device 420. The validity timer at the first device 410-1 can be reset as well after transmitting the above validity information.

Furthermore, on top of TA estimation, the validity timer can also be utilized to cover the system broadcasted information is valid to achieve UL frequency synchronization. The first device 410-1 can maintain the validity timer and send the validity information to the second device 420 if its system broadcasted information is valid to both TA estimation and UL frequency synchronization, in order to synchronize with the second device 420 that the system broadcasted information is valid in the first device 410-1 both TA and UL frequency synchronization. In the UL frequency synchronization case, if the validity timer is expired in the first device 410-1, the first device 410-1 should not RACH again to avoid inter-UE interference in PRBs (frequency domain). Similarly, if the validity timer is expired in the second device 420, the second device 420 should not send PDCCH order and ask the first device 410-1 do PRACH again.

Figure 7:
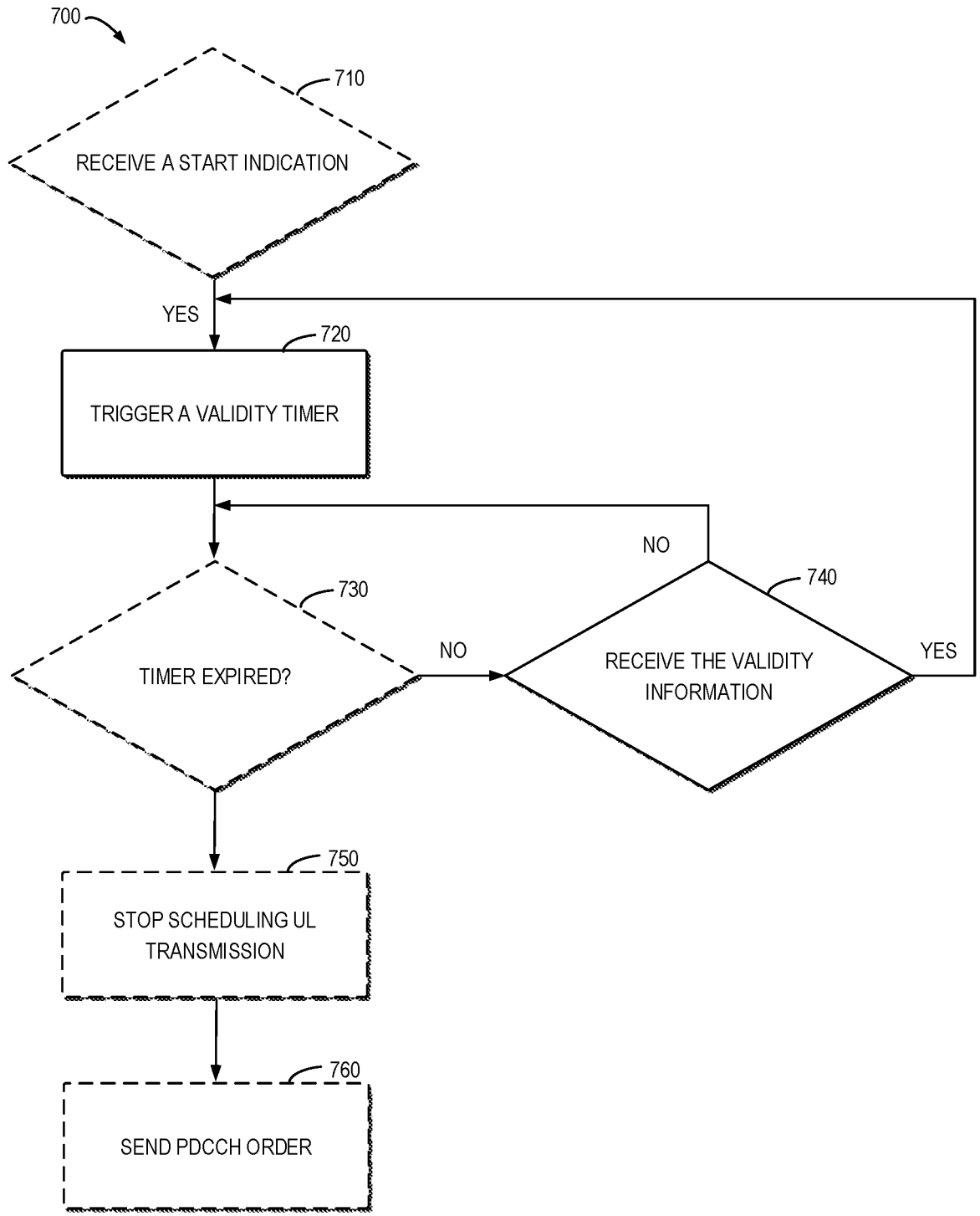
FIG. 7 illustrates a flowchart of a method implemented at a second apparatus according to some other example embodiments of the present disclosure.

FIG. 7 shows a flowchart of an example method 700 in accordance with some example embodiments of the present disclosure. For the purpose of discussion, the method 700 will be described from the perspective of the second device 420.

In some embodiments, at block 710, the second device 420 can determine whether a start indication to start the other validity timer at the second device 420 is received. If the start indication is received, the second device 420, at block 720, triggers the other validity timer. In some embodiments, the other validity timer can be triggered after the random access procedure successfully completes. In some embodiments, the second device 420 may receive an indication to trigger the other validity timer. The second device 420 may trigger the other validity timer based on the indication. The indication can be implicit or explicit. In some embodiments, to ensure that the validity timers at the first device 410-1 and the second device 420 can be started, reset and stopped at the same time, the first device 410-1 can apply an offset to its validity timer. The offset can be a value accounting for RTT and processing delays.

In some embodiments, at block 730, the second device 420 can determine whether the other validity timer is expired. If the other validity timer is not expired, at block 740, the second device 410 determines whether the validity information indicating the system broadcasted information is valid is received or not. If the validity information is not received, the second device 420 can determine whether the other validity timer is expired again. If the validity information is received, the second device 420 can trigger the other validity timer again (i.e., reset the other validity timer).

In some embodiments, the validity information can indicate that the system broadcasted information is valid for TA estimation. Alternatively or in addition, the validity information can indicate more validation status. For example, the validity information can indicate that the system broadcasted information is valid for frequency compensation. The validity information can comprise an indication on whether the system broadcasted information is valid for the compensation in time domain. In other embodiment, the validity information can comprise an indication on whether the system broadcasted information is valid for the compensation in frequency domain. Alternatively or in addition, the validity information can comprise a currently used timing advance. In other embodiments, the validity information can comprise a currently used frequency shift. The validity information can also indicate last time when accurate system broadcasted information is received by the first device 410-1.

In some embodiments, the validity information can be received in a medium access control (MAC) control element (CE). The MAC CE can be received on a physical uplink shared channel (PUSCH). For example, the MAC CE can be received in uplink control information. Alternatively, the validity information can be received together with other transmissions, which can save energy. For example, the validity information can be received in a channel quality indicator (CQI) report.

In some embodiments, the validity information can be received in a scheduling request (SR). Alternatively or in addition, the validity information can be received in a hybrid automatic repeat request (HARQ) feedback. In other embodiments, the validity information can be received in other UL transmission. The validity information can be received implicitly. For example, if the SR transmitted by the first device 410-1 is well time aligned with the second device 420, the second device 420 can determine that the system broadcasted information is valid. Similarly, if the HARQ feedback or UL transmission is time aligned with the second device 420, the system broadcasted information can be determined to be valid. In some embodiments, the validity information can be transmitted via a RRC signaling transmitted between the first device 410-1 and the second device 420.

In some embodiments, if the other validity timer is expired, the second device 420 at block 750 can stop scheduling the first device 410-1 for UL transmissions. In addition, at block 760, the second device 420 may send PDCCH order for initiating another random access procedure. In some embodiment, the second device 420 may include one additional bit in the TA command MAC IE to indicate the first device 410-1 to trigger system broadcasted information based timing synchronization in connected mode. In this case, if the first device 410-1 cannot simultaneously operate GNSS and cellular radio (for example, IoT or enhanced mobile broadband (eMBB)), the second device 420 can also create scheduling gap to complete the GNSS operation.

In some example embodiments, an apparatus capable of performing any of the method 600 (for example, the first device 410) may comprise means for performing the respective operations of the method 600. The means may be implemented in any suitable form. For example, the means may be implemented in a circuitry or software module. The first apparatus may be implemented as or included in the first device 410. In some example embodiments, the means may comprise at least one processor and at least one memory including computer program code. The at least one memory and computer program code are configured to, with the at least one processor, cause performance of the apparatus.

In some embodiments, the apparatus comprises means for triggering, at a first device, a validity timer of system broadcasted information which is used for deriving a compensation on a transmission between the first device and a second device in a time and/or frequency domain; means for determining whether the system broadcasted information is valid for the compensation before an expiration of the validity timer; means for in accordance with a determination that the system informing is valid, transmitting, to the second device, validity information indicating that the system broadcasted information is valid; and means for resetting the validity timer.

In some embodiments, the means for transmitting the validity information comprises: means for transmitting the validity information based on one of: a predetermined period, a request received from the second device for the validity information, or a condition that causes changing validity of the system broadcasted information being fulfilled.

In some embodiments, the validity information comprises at least one of: an indication on whether the system broadcasted information is valid for the compensation in time domain, an indication on whether the system broadcasted information is valid for the compensation in frequency domain, a currently used timing advance, a currently used frequency shift, or last time when accurate system broadcasted information was received by the first device.

In some embodiments, the apparatus further comprises means for determining an accuracy of the system broadcasted information; and means for in accordance with a determination that the accuracy of the system broadcasted information is below a threshold accuracy, suspending at least one of: the transmission between the first device and the second device or the transmission of the validity information.

In some embodiments, the apparatus further comprises means for in accordance with a determination that the accuracy of the system broadcasted information is below the threshold accuracy and the validity timer is running, apply a previous valid compensation in the time and/or frequency domain for the transmission between the first device and the second device.

In some embodiments, the apparatus further comprises means for in accordance with a determination that the accuracy of the system broadcasted information exceeds the threshold accuracy, transmitting the validity information to the second device to restart a further validity timer at the second device; and means for resetting the validity timer at the first device.

In some embodiments, the apparatus further comprises mans for determining that the accuracy of the system broadcasted information is below the threshold accuracy if at least one of the following is fulfilled: a change of a timing advance estimated based on the system broadcasted information exceeds a threshold change, the timing advance estimated based on the system broadcasted information indicates a step exceeding a threshold step, or a detected signal strength of the system broadcasted information is below a threshold.

In some embodiments, the means for transmitting the validity information comprises: means for transmitting the validity information in at least one of: a medium access control (MAC) control element (CE), a scheduling request, a hybrid automatic repeat request (HARM) feedback, or a radio resource control signaling transmitted between the first device and the second device.

In some embodiments, the apparatus further comprises means for in accordance with a determination that the validity timer expires, performing at least one of: stopping the transmission to the second device, or initiating a random access to the second device.

In some embodiments, the apparatus further comprises means for receiving, from the second device, a configuration indicating at least one of: a duration of the validity timer, an threshold accuracy of the system broadcasted information, or a validity information updated periodicity.

In some embodiments, the apparatus further comprises means for receiving, from the second device, an indication to start a timing adjustment and/or frequency adjustment based on the system broadcasted information before an expiration of the validity timer.

In some embodiments, the apparatus further comprises means for applying an offset to the validity timer, the offset at least comprising a round trip time between the first device and the second device.

In some embodiments, the apparatus further comprises means for transmitting, to the second device, an implicit or explicit start indication to trigger another validity timer at the second device.

In some example embodiments, a second apparatus capable of performing any of the method 700 (for example, the second device 420) may comprise means for performing the respective operations of the method 700. The means may be implemented in any suitable form. For example, the means may be implemented in a circuitry or software module. The first apparatus may be implemented as or included in the second device 320. In some example embodiments, the means may comprise at least one processor and at least one memory including computer program code. The at least one memory and computer program code are configured to, with the at least one processor, cause performance of the apparatus.

In some embodiments, the apparatus comprises means for triggering, at a second device, a validity timer of system broadcasted information which is used for deriving a compensation on a transmission between a first device and the second device in a time and/or frequency domain by a first device; means for receiving, from the first device, validity information indicating that the system broadcasted information is valid; and means for resetting the validity timer.

In some embodiments, the apparatus further comprises means for transmitting a request for the validity information to the first device.

In some embodiments, the validity information comprises at least one of: an indication on whether the system broadcasted information is valid for the compensation in time domain, an indication on whether the system broadcasted information is valid for the compensation in frequency domain, a currently used timing advance, a currently used frequency shift, or last time when accurate system broadcasted information was received by the first device.

In some embodiments, the validity timer is triggered by an implicit or explicit start indication received from the first device.

In some embodiments, the means for receiving the validity information comprises receiving the validity information in at least one of: a medium access control (MAC) control element (CE), a scheduling request, a hybrid automatic repeat request (HARM) feedback, or a RRC signaling between the first device and the second device.

In some embodiments, the apparatus further comprises means for transmitting, to the first device, a configuration indicating at least one of: a duration of the validity timer, a threshold accuracy of the system broadcasted information or validity information update periodicity.

In some embodiments, the apparatus further comprises means for determining a timing advance drift based on the transmission; and means for in accordance with a determination that the timing advance drift exceeds a threshold drift, transmitting, to the first device, an indication to start a timing adjustment and/or frequency adjustment based on the system broadcasted information.

In some embodiments, the apparatus further comprises means for in accordance with a determination that the validity timer expires, suspending scheduling the first device; and means for transmitting, to the first device, a physical random access channel (PRACH) order to trigger the first device to perform a random access to the second device.

Figure 8:
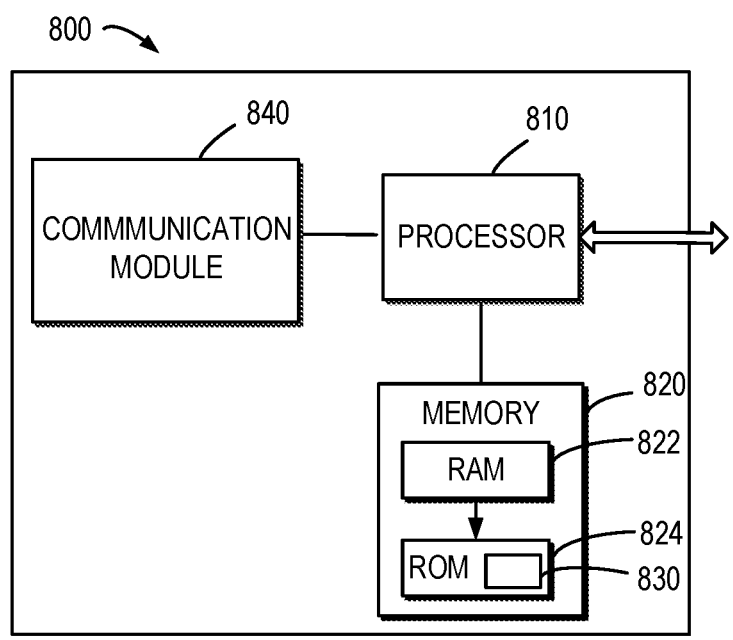
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 110 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

Example embodiments of the present disclosure may be implemented by means of the program 830 so that the device 800 may perform any process of the disclosure as discussed with reference to FIGS. 5 to 7. The example embodiments of the present disclosure may also be implemented by hardware or by a combination of software and hardware.

Figure 9:
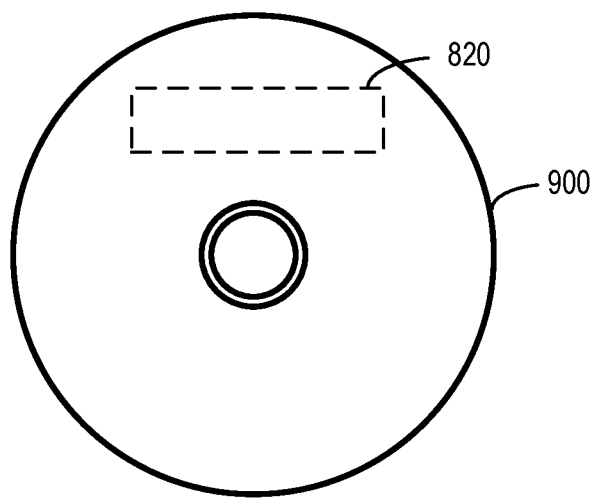
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and other magnetic storage and/or optical storage. FIG. 9 shows an example of the computer readable medium 900 in form of an optical storage disk. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE) operating in a Non-Terrestrial Network (NTN) using New Radio (NR), the UE comprising:
   at least one processor; and
   at least one memory including computer program code that, when executed by the processor, cause the UE device to perform the following operations:
      after successful completion of a four-step random access procedure, receiving, via Radio Resource Control (RRC) signaling from a network node, a configuration of a UE-specific validity timer whose duration is determined based on a signal-to-noise ratio (SNR) and a channel quality between the UE and the network node;
      triggering a validity timer of system broadcasted information comprising Global Navigation Satellite System (GNSS) location information and GNSS timestamp information for deriving a compensation on a transmission between the UE and the network node in a time and frequency domain;
      applying, when triggering, an offset equal to a sum of a round-trip time (RTT) and processing delays so that the validity timer of the UE is synchronized with a further validity timer maintained by the network node;
      determining whether the system broadcasted information is valid for the compensation before an expiration of the validity timer, wherein determining comprises verifying that (i) a difference among systembroadcasted-information-based timing advance (TA) estimations does not exceed a threshold change and (ii) a difference among frequency-shift estimations does not exceed a threshold; and based on determining that the system broadcasted information is valid, transmitting, to the network node, validity information indicating that the system broadcasted information is valid, the validity information being carried in a Medium Access Control (MAC) Control Element (CE) on a Physical Uplink Shared Channel (PUSCH), the validity information comprising: an indication that the system broadcasted information is valid for timing-advance estimation and uplink frequency synchronization, a currently used TA, and a last time at which accurate system broadcasted information was received.

2. The UE of claim 1, wherein subsequent validity information updates are carried in a channel quality indicator (CQI) report on the PUSCH.

3. The UE of claim 2, wherein subsequent validity information updates are carried in a scheduling request (SR).

4. The UE of claim 3, wherein the UE implicitly indicates that the system broadcasted information is valid by transmitting: (i) a scheduling request (SR) and (ii) a hybrid automatic repeat request (HARQ) feedback that is time-aligned with the network node.

5. The UE of claim 4, wherein, upon expiration of the validity timer, the UE stops uplink data transmission and initiates a random access procedure using a PRACH resource reserved for UEs without valid system broadcasted information.

6. The UE of claim 5, wherein, when an accuracy of GNSS information is determined to be below a threshold accuracy while the validity timer is still running, the UE applies a previously valid TA determined within a prior time window for uplink transmission.

7. The UE of claim 6, wherein the validity information further comprises a currently used frequency shift.

8. The UE of claim 7, wherein the UE receives, in a TA command Medium Access Control (MAC) information element, an additional bit indicating to trigger system-broadcasted-information-based timing synchronization in connected mode, and, responsive thereto, refrains from uplink transmission during a scheduling gap to perform GNSS acquisition or update.

9. The UE of claim 8, wherein the threshold change for TA estimations differs from the threshold for frequency-shift estimations.

10. The UE of claim 1, further comprising receiving, via Radio Resource Control (RRC) signaling, a configuration that specifies a validity-information update periodicity, and transmitting the validity information at the specified periodicity while resetting the validity timer upon each transmission.

11. A system comprising:
a user equipment (UE) operating in a Non-Terrestrial Network (NTN) using New Radio (NR);
at least one processor; and
at least one memory including computer program code that, when executed by the processor, cause the UE device to perform the following operations:
after successful completion of a four-step random access procedure, receiving, via Radio Resource Control (RRC) signaling from a network node, a configuration of a UE-specific validity timer whose duration is determined based on a signal-to-noise ratio (SNR) and a channel quality between the UE and the network node;
triggering a validity timer of system broadcasted information comprising Global Navigation Satellite System (GNSS) location information and GNSS timestamp information for deriving a compensation on a transmission between the UE and the network node in a time and frequency domain;
applying, when triggering, an offset equal to a sum of a round-trip time (RTT) and processing delays so that the validity timer of the UE is synchronized with a further validity timer maintained by the network node;
determining whether the system broadcasted information is valid for the compensation before an expiration of the validity timer, wherein determining comprises verifying that (i) a difference among system-broadcasted-information-based timing advance (TA) estimations does not exceed a threshold change and (ii) a difference among frequency-shift estimations does not exceed a threshold; and
based on determining that the system broadcasted information is valid, transmitting, to the network node, validity information indicating that the system broadcasted information is valid, the validity information being carried in a Medium Access Control (MAC) Control Element (CE) on a Physical Uplink Shared Channel (PUSCH), the validity information comprising: an indication that the system broadcasted information is valid for timing-advance estimation and uplink frequency synchronization, a currently used TA, and a last time at which accurate system broadcasted information was received.

12. The system of claim 11, wherein subsequent validity information updates are carried in a channel quality indicator (CQI) report on the PUSCH.

13. The system of claim 12, wherein subsequent validity information updates are carried in a scheduling request (SR).

14. The system of claim 13, wherein the UE implicitly indicates that the system broadcasted information is valid by transmitting: (i) a scheduling request (SR) and (ii) a hybrid automatic repeat request (HARQ) feedback that is time-aligned with the network node.

15. The system of claim 14, wherein, upon expiration of the validity timer, the UE stops uplink data transmission and initiates a random access procedure using a PRACH resource reserved for UEs without valid system broadcasted information.

16. The system of claim 15, wherein, when an accuracy of GNSS information is determined to be below a threshold accuracy while the validity timer is still running, the UE applies a previously valid TA determined within a prior time window for uplink transmission.

17. The system of claim 16, wherein the validity information further comprises a currently used frequency shift.

18. The system of claim 17, wherein the UE receives, in a TA command Medium Access Control (MAC) information element, an additional bit indicating to trigger system-broadcasted-information-based timing synchronization in connected mode, and, responsive thereto, refrains from uplink transmission during a scheduling gap to perform GNSS acquisition or update.

19. The system of claim 18, wherein the threshold change for TA estimations differs from the threshold for frequency-shift estimations.

20. The system of claim 19, further comprising receiving, via Radio Resource Control (RRC) signaling, a configuration that specifies a validity-information update periodicity, and transmitting the validity information at the specified periodicity while resetting the validity timer upon each transmission.

* * * * *